(12) United States Patent
Shama et al.

(10) Patent No.: US 11,876,825 B1
(45) Date of Patent: Jan. 16, 2024

(54) SYSTEM, METHOD, AND COMPUTER PROGRAM FOR USING METRIC VALUATIONS IN ANOMALY SCORING

(71) Applicant: Amdocs Development Limited, Limassol (CY)

(72) Inventors: Gilli Shama, Ra'anana (IL); Nadeem Azaizah, Dabburiya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/389,175

(22) Filed: Jul. 29, 2021

(51) Int. Cl.
*H04L 9/40* (2022.01)
*H04L 41/16* (2022.01)
*H04L 41/147* (2022.01)
*H04L 41/142* (2022.01)

(52) U.S. Cl.
CPC ........ *H04L 63/1433* (2013.01); *H04L 41/142* (2013.01); *H04L 41/147* (2013.01); *H04L 41/16* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,483,934 | B1 | 1/2009 | Ide et al. |
| 9,807,105 | B2 | 10/2017 | Cheng et al. |
| 2016/0147583 | A1* | 5/2016 | Ben Simhon ......... G06F 11/076 714/47.3 |
| 2017/0111378 | A1 | 4/2017 | Caffrey |
| 2018/0191763 | A1* | 7/2018 | Hillard ................ H04L 63/1416 |
| 2018/0336353 | A1* | 11/2018 | Manadhata ......... G06F 16/3334 |
| 2022/0215467 | A1* | 7/2022 | Virk ..................... G06Q 20/405 |

* cited by examiner

*Primary Examiner* — John A Follansbee
*Assistant Examiner* — Fadi Haj Said
(74) *Attorney, Agent, or Firm* — Zilka-Kotab, P.C.

(57) ABSTRACT

As described herein, a system, method, and computer program are provided for using metric valuations in anomaly scoring. In use, a score calculated for a metric used for anomaly detection is identified. Additionally, the score is weighted, based on a valuation defined for the metric, to form a weighted score. Further, at least one action is caused to be performed, based on the weighted score.

8 Claims, 5 Drawing Sheets

SYSTEM, METHOD, AND COMPUTER PROGRAM FOR USING METRIC VALUATIONS IN ANOMALY SCORING

FIELD OF THE INVENTION

The present invention relates to anomaly detection in computer systems.

BACKGROUND

Many systems are monitored by multi-variable time series metrics. For example, information technology (IT) systems may be monitored by a set of application and hardware metrics, or a health of a patient in a hospital may be monitored with a set of medical metrics. In such a monitoring environment, data is collected in near real-time. Anomalies in the data can be detected using the various metrics, such as when there is some deviation from a defined baseline. Moreover, a scoring of an anomaly behavior in a multi-variable setup is valuable for setting action and alerting priority.

However, while processes currently exist to score the detected anomaly behavior, these processes do not provide any additional levels of scoring beyond the particular anomaly. As a result, the action/alerting triggers are limited to the anomaly-specific score without taking into consideration other contextual information. There is thus a need for addressing these and/or other issues associated with the prior art.

SUMMARY

As described herein, a system, method, and computer program are provided for using metric valuations in anomaly scoring. In use, a score calculated for a metric used for anomaly detection is identified. Additionally, the score is weighted, based on a valuation defined for the metric, to form a weighted score. Further, at least one action is caused to be performed, based on the weighted score.

DETAILED DESCRIPTION

Figure 1:
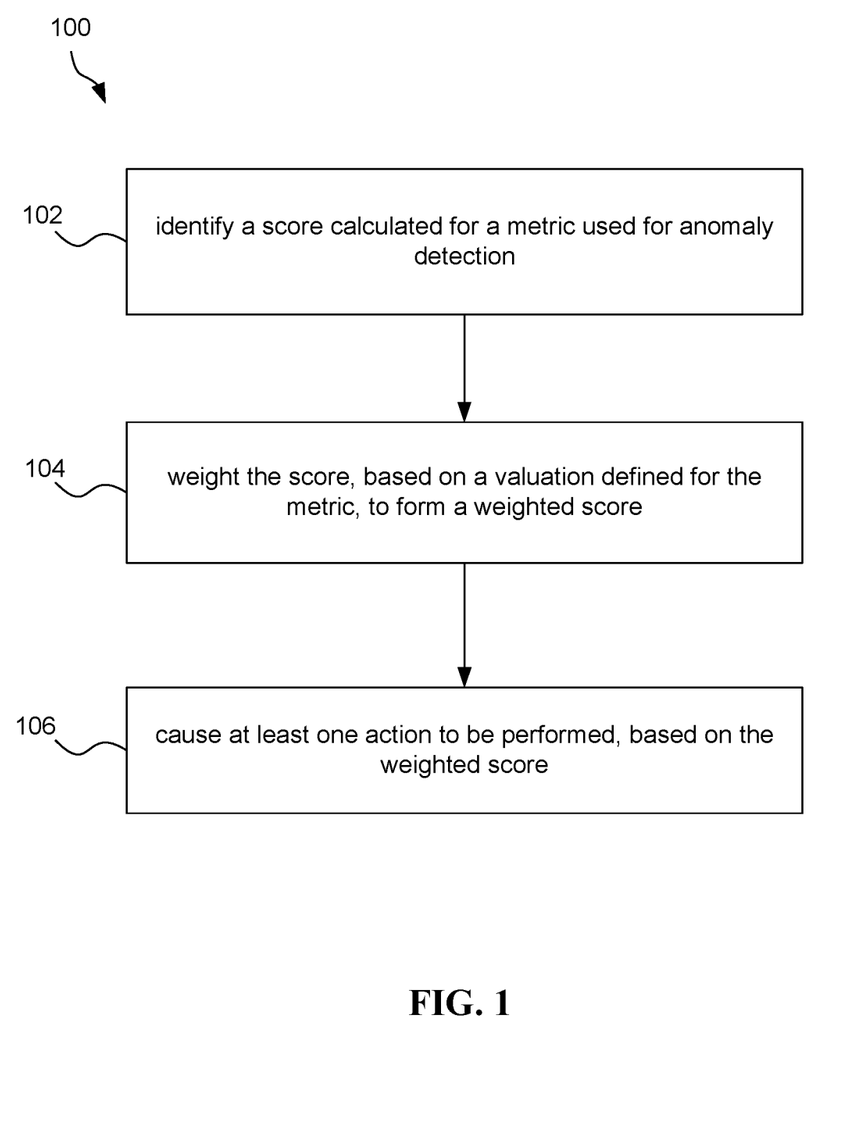
FIG. 1 illustrates a method for using metric valuations in anomaly scoring, in accordance with one embodiment.

FIG. 1 illustrates a method 100 for using metric valuations in anomaly scoring, in accordance with one embodiment. The method 100 may be performed by any computer system, such as those described below with respect to FIGS. 4 and/or 5. For example, the method 100 may be performed by a computer system that monitors other computer systems for the purpose of detecting anomalies associated with those other computer systems. Of course, as another option the method 100 may be performed by an application installed on a computer system for the purpose of detecting anomalies associated with that computer system. As yet another option, the method 100 may be performed by a computer system that is independent of, but in communication with, the aforementioned computer systems that monitor for anomalies.

In operation 102, a score calculated for a metric used for anomaly detection is identified. The metric used for anomaly detection may be any parameter of an application and/or system (e.g. computer, network, etc.) component that is capable of being monitored for the purpose of detecting anomalies in the functionality, configuration, or any other aspect of the application and/or system. Anomalies refer to deviations from what is expected, such as a baseline value or range.

The score may be any value (e.g. numerical) calculated for the metric. In one embodiment, the score may be calculated based on an observed value for the metric at a particular time or over a particular time period. For example, the score may be calculated using a continuous function in which the score is based on a distance of the observed value from an actual value in standard deviations for the metric.

In another embodiment, the score may be the value observed for the metric at a particular time. For example, the score may be calculated using a dichotomous function in which the score is 1 when the observed value is outside of a defined range thus indicating an undesired anomaly, and the score is 0 when the observed value is within the defined range thus indicating a desired anomaly.

In yet another embodiment, the score may be a prediction for the metric at a future time or over a future time period. The prediction may be made using a machine learning model trained using a history of scores calculated for the metric, as an option. The score representative of the prediction may also be made according to a continuous function or a dichotomous function applied to one or more predicted observations for the metric.

The score may be identified from a database storing scores calculated for various metrics. The database may be populated by a source system that monitors the certain application and/or system components with regard to the metrics. Of course, however, the score may be identified as a direct result of calculating the score for the metric. As an option, the score may be included in a state comprised of a series of scores calculated for a corresponding series of metrics used for the anomaly detection. Optionally, the state may be a predicted state comprised of a series of predicted scores for the corresponding series of metrics at a future time. As a further option, the predicted state may be made using a machine learning model trained using a history of scores calculated for the series of metrics.

Additionally, in operation 104, the score is weighted, based on a valuation defined for the metric, to form a weighted score. The valuation refers to a weight defined for the metric. For example, the valuation may be a numerical value, which may optionally be selected from a possible numerical range. In one embodiment, the valuation may be manually defined.

The valuation may be indicative of a contribution of the metric when considering performance of at least one action. Just by way of example, the valuation may be a numerical value between −1 to +1, where a value of 0 indicates that the score is given no contribution when considering performance of the at least one action, a value of +1 indicates that the higher the score the greater the contribution of the score when considering the performance of the at least one action, and a value of −1 indicates that the lower the score the greater the contribution of the score when considering the performance of the at least one action.

In an embodiment where the score is calculated for the metric based on an observed value at a particular time, then the valuation that is used to weight the score may be a valuation that is defined for a combination of the metric and the particular time. For example, in this case different valuations may be defined for the metric with respect to time.

In one embodiment, the score may be weighted by multiplying the score by the valuation. Of course, it should be noted that any predefined function may be used to weight the score using the valuation.

Further, in operation 106, at least one action is caused to be performed, based on the weighted score. In one embodiment, the at least one action may be caused (e.g. triggered) to be performed as a direct function of the weighted score. For example, it may be determined whether the weighted score is outside of a defined range indicative of a desired anomaly, and the at least one action may be caused to be performed, based on the determination. In particular, the at least one action may be caused to be performed when it is determined that the weighted score is outside of the defined range indicative of a desired anomaly.

In another embodiment, the at least one action may be caused to be performed as an indirect function of the weighted score. For example, the weighted score may be used to calculate other scores or to derive other information that may be the basis for determining whether to cause the at least one action to be performed. In an exemplary embodiment where the score is included in the state comprised of the series of scores calculated for the corresponding series of metrics used for the anomaly detection, then the weighted score may be used for determining a weighted score for the state by weighting each score in the series of scores by a valuation defined for a corresponding metric, and determining an average of the weighted scores to form the weighted score for the state. The weighted score for the state may then be used as a basis for causing the at least one action to be performed.

It should be noted that the at least one action may be any predefined action. Just by way of example, the at least one action may be generating an alert, notification, etc. (e.g. of the detected anomaly). As another example, the at least one action may be determining a cause of the detected anomaly. As yet another example, the at least one action may be triggering a change in the monitored applications and/or system (e.g. based on the determined cause) to avoid a recurrence of the detected anomaly.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
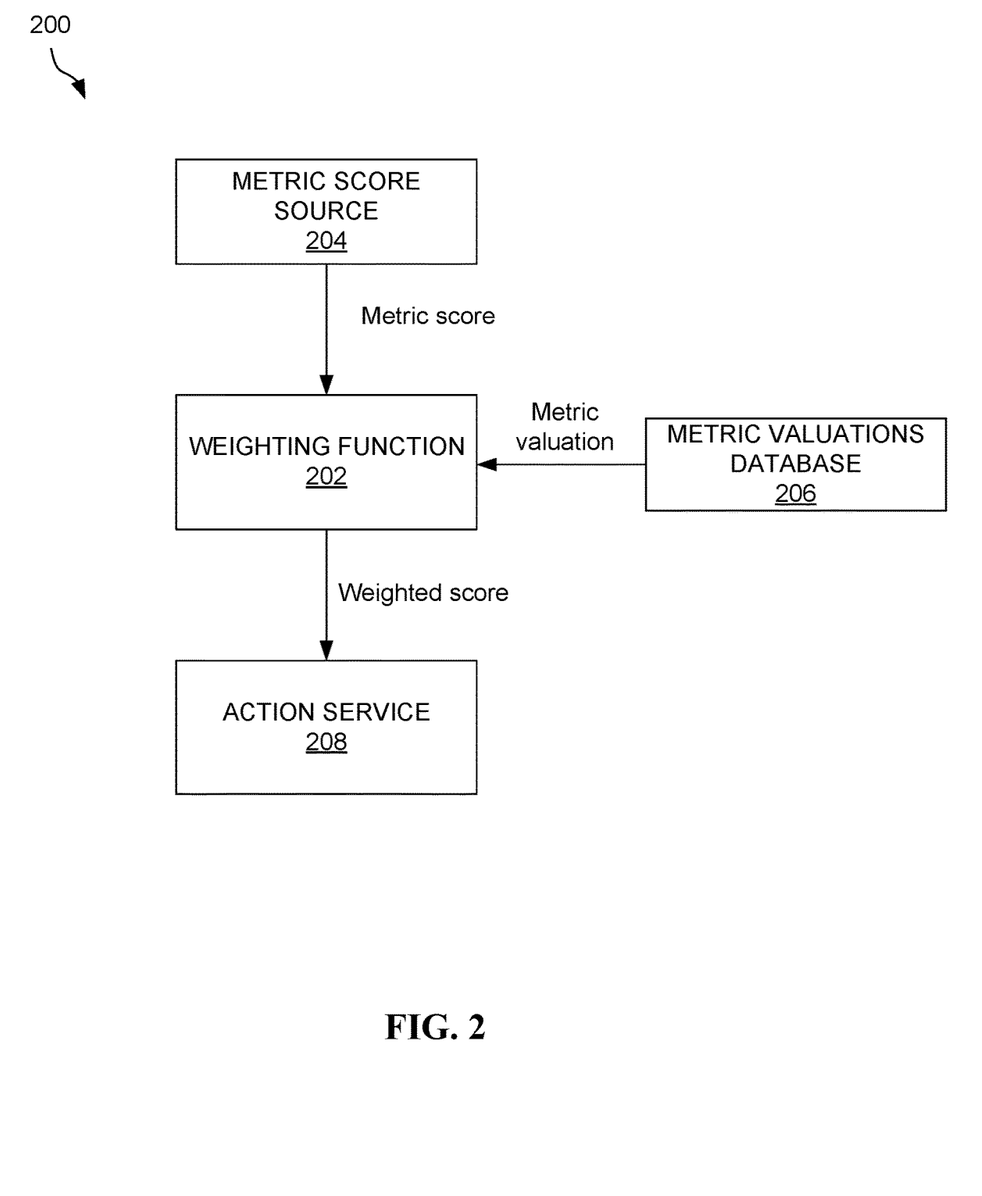
FIG. 2 illustrates a flow diagram of a system for using metric valuations in anomaly scoring and anomaly detection, in accordance with one embodiment.

FIG. 2 illustrates a flow diagram of a system 200 for using metric valuations in anomaly scoring and anomaly detection, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a weighted function 202 receives as input a metric score from a metric score source 204 and a metric valuation from a metric valuations database 206. The metric score is a score calculated for a metric used for anomaly detection. The metric score source 204 may be a local or remote function that calculates the metric score, a remote computer system that calculates the metric score, or a local or remote database that stores an already calculated metric score, for example.

The metric valuation is a valuation (e.g. weight) defined for the metric. The metric valuations database 206 may be a local or remote database that stores valuations defined for various metrics used for anomaly detection. The valuations may be manually defined by one or more users via a user interface and then stored in the metric valuations database 206.

The weighted function 202 may be implemented by a computer system local or remote with respect to the metric score source 204 and the metric valuations database 206. The weighted function 202 weights the score based on the metric valuation. In other words, the weighted function 202 uses the metric score and the metric valuation to calculate a weighted score for the metric.

As shown, the weighted score is output by the weighted function 202 to an action service 208. The action service 208 operates to cause at least one action to be performed, based on the weighted score. For example, the action service 208 may determine whether to perform the at least one action, based on whether the weighted score meets some predefined criteria, and/or may determine which action(s) to perform. It should be noted that the action service 208 may be located on a computer system that is local or remote with respect to the weighted function 202.

Figure 3:
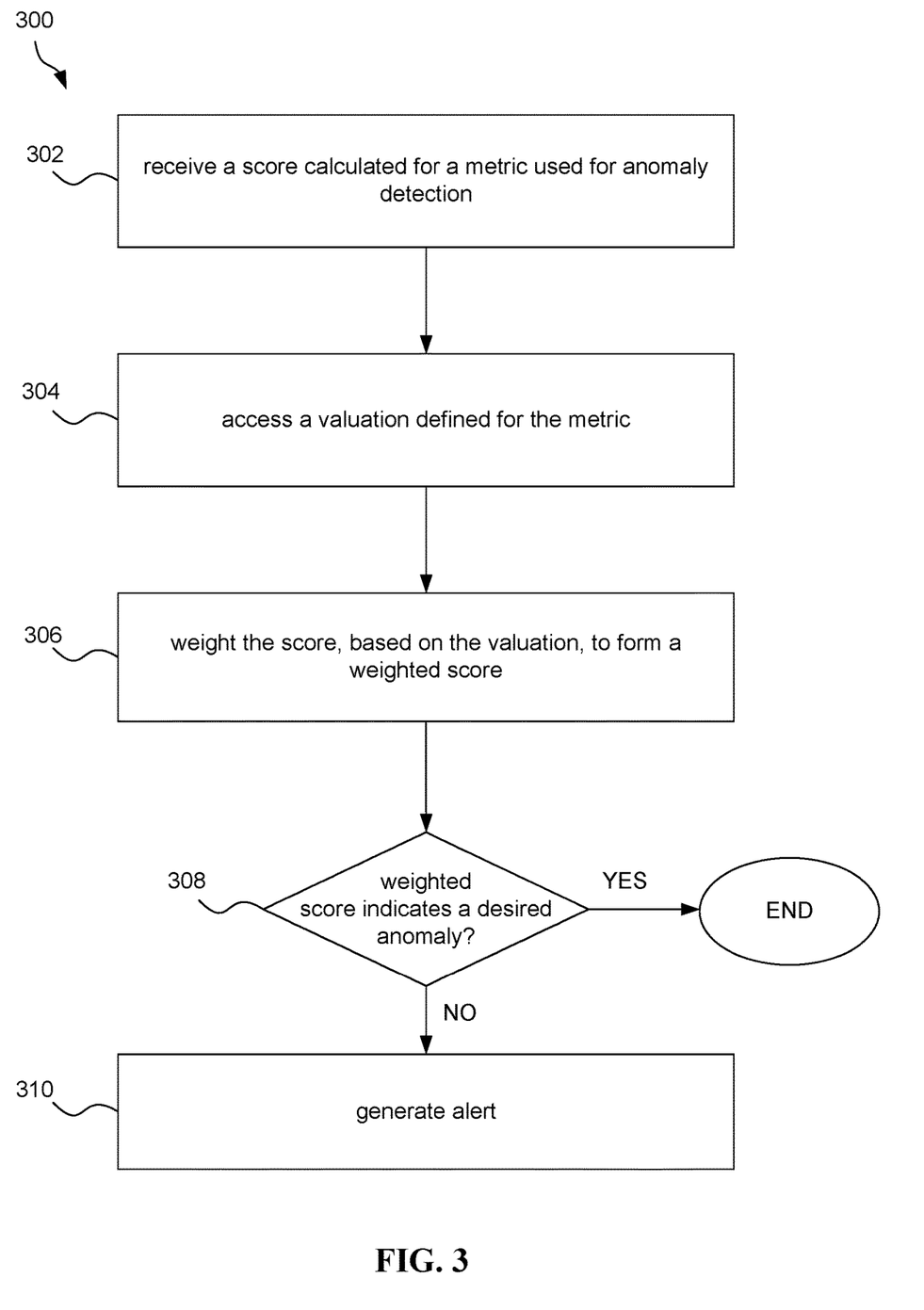
FIG. 3 illustrates a method for triggering an action associated with detection of an anomaly, in accordance with one embodiment.

FIG. 3 illustrates a method 300 for triggering an action associated with detection of an anomaly, in accordance with one embodiment. As an option, the method 300 may be carried out in the context of the details of the previous figure and/or any subsequent figure(s). For example, the method 300 may be carried out by the weighting function 202 of FIG. 2. Of course, however, the method 300 may be carried out in the context of any desired environment. Further, the aforementioned definitions may equally apply to the description below.

In operation 302, a score calculated for a metric used for anomaly detection is received. For example, the score may be received from the metric score source 204 of FIG. 2. In operation 304, a valuation defined for the metric is accessed. For example, the valuation may be accessed from the metric valuations database 206 of FIG. 2.

In operation 306, the score is weighted, based on a valuation defined for the metric, to form a weighted score. For example, the score may be weighted using the weighting function 202 of FIG. 2. In decision 308, it is determined whether the weighted score indicates a desired anomaly. The desired anomaly may be defined as a desired range for weighted scores. Accordingly, if the weighted score is within the desired range for weighted scores, then it may be determined that the weighted score indicates a desired anomaly. As shown, when it is determined that the weighted score indicates a desired anomaly, then no action may be taken and the method 300 may end.

On the other hand, if the weighted score is not within the desired range for weighted scores, then it may be determined that the weighted score does not indicate a desired anomaly. For example, it may be determined that the weighted score indicates an undesired anomaly. As shown, when it is determined that the weighted score does not indicate a desired anomaly, then an alert is generated (e.g. by action service 208 of FIG. 2). Of course, other actions may alternatively or additionally be caused to be performed.

EMBODIMENTS SUMMARY

The method and systems described above allow anomalies to be scored per a single metric by a statistically calculated anomaly level, multiplied by a valuation which may be a business score of the importance of the metric (see embodiment 1 below). A single metric anomaly may also be scored by its potential impact on other metrics anomalies and their valuation/importance (see embodiment 2 below). Lastly, a combined anomaly state may be scored by predicted future scoring (see embodiments 3 and 4 below).

To this end, alerting in a monitoring system may not be binary, but may have levels of anomaly over a scale. Alerting may be per a single metric anomaly, per a cluster of related metrics, or per an entire state of a set of metrics. The alerting may be for a concurrent issue by its importance and volume, as well as for predicted future results.

The embodiments described below are presented in order of level of complexity. Each embodiment is a base for the next, yet each stage can serve a scoring by its own. The embodiments below are all based on a base anomaly score (A). The anomaly score of an observed value y for metric i measured in time t can be dichotomous, as in the example Equation 1. The anomaly score can also be a continuous numeric value, for example the distance of the observed value from actual value in standard derivations for the metric and the time of day, or the square of the distance of an observed value from actual value, as in the example Equation 2.

$$A(y_{i,t}) = \begin{cases} 1 & \text{Actual value } y_{i,t} \text{ is an undesired detected anomaly} \\ 0 & \text{Actual value } y_{i,t} \text{ is witin normal range} \\ & \text{or is a desired detected anomaly} \end{cases} \quad \text{Equation 1}$$

$$A(y_{i,t}) = (y_{i,t} - \hat{y}_{i,t})^2 \quad \text{Equation 2}$$

Embodiment 1—Anomaly-Value Score Per Metric

In the present embodiment, a human defined vector V of the business value per each metric is provided. The variable v_(i,t) is the value for metric i in time t, where i is from 1 to n representing the number of metrics. The value can change over time t, or can be constant across time. The value score v_(i,t) is between −1 to +1. A metric value of 0 means that this metric doesn't reflect any value at all. A metric value of +1 means that the higher this metric is the better, and −1 implies the opposite direction (i.e. the lower this metric is, the better). When comparing two metrics, if one has a higher absolute value than the absolute value of the second metric, then it may be determined to be more important.

An anomaly-value AV score for an observed value y of metric i in time t is the anomaly score, described above, multiplied by its value score, as in the example Equation 3.

$$AV(y_{i,t}) = A(y_{i,t}) \times v_{i,t} \quad \text{Equation 3}$$

Note that, in case of an anomaly score that is dichotomous, as in Equation 1, the anomaly value score will be the value if there is an undesired anomaly and will be 0 elsewhere.

Embodiment 2—Anomaly-Value Score Per State

A state (e.g. of an application, system, etc.) is a set of metrics values at a given time t, as represented in Equation 4.

$$\vec{y}_t = \begin{pmatrix} y_{1,t} \\ \vdots \\ y_{n,t} \end{pmatrix} \quad \text{Equation 4}$$

The anomaly-value score AV per state on time t is the average of anomaly value scores per metric, as in exemplary Equation 5.

$$AV(\vec{y}_t) = \frac{1}{n} \sum_{i=1}^{n} A(y_{i,t}) \times v_{i,t} \quad \text{Equation 5}$$

Note that, in case of an anomaly score that is dichotomous, as in Equation 1, the anomaly value score will be the sum of values for metrics with undesired anomaly only, divided by n.

Embodiment 3—Predicted Anomaly Score for Future Value Impact Based on Dichotomous Anomaly Score For a dichotomous anomaly score (Equation 1) there may be models that predict the probability that there will be an undesired anomaly in horizon h, that is from a current time t until the time t+h. Based on a predicted probability to an upcoming anomaly, the anomaly score may be updated to form a predicted anomaly value PAV, as in exemplary Equation 6. (A simple model would assume that the value for metric i is not time dependent)

$$PAV(y_{i,t,h}) = \frac{1}{n} \sum_{j=1}^{n} P\left(\sum_{s=t}^{t+h} A(y_{j,s}) > 0 | A(y_{i,t})\right) \times v_j \quad \text{Equation 6}$$

Note that, in case there is a concurrent anomaly in metric i then v_i is included in the sum, plus also for each other metric its probability for failure given the known failure in metric i multiplied by the metric importance is included. Also note that even when there is no anomaly in metric i, there is still a scoring, though it is likely to be a low score.

Equation 6 can be easily extended to a state score by taking all metrics as the base for probability, as in exemplary Equation 7.

$$PAV(\vec{y}_{t,h}) = \frac{1}{n} \sum_{j=1}^{n} P\left(\sum_{s=t}^{t+h} A(y_{j,s}) > 0 | \vec{A}(\vec{y}_t)\right) \times v_j \quad \text{Equation 7}$$

Note that, $\vec{A}(\vec{y}_t)$ is a vector of 0s and 1s. If on metric j there is currently an undesired anomaly, then the probability for its anomaly will be 1 and $v_j$ will appear on the average. If metric j is currently normal, then its probability for undesired anomaly multiplied by its importance will be added to the sum.

Embodiment 4—Predicted Anomaly Score for Future Value Impact Based on Continuous Anomaly Score The PAV scoring presented above in Equations 6 and 7 for a dichotomous anomaly can be further expanded for a continuous anomaly score, as in Equation 2.

In a dichotomous anomaly there is an actual anomaly score $A(y_{i,t})$ and there are predictions to the anomaly score. The prediction can be based on the history and relations between metric i and an explaining metric j, $A(\hat{y}_{i,t,j})$, or on a history of all measured metrics $A(\hat{y}_{i,t})$. For metric i, there may be both the predicted anomaly to time t and the value in time t: $v_{i,t}$. Equation 3 multiplied the actual anomaly score with the actual value to get actual anomaly score. If a predicted anomaly score at a future time is multiplied with the value at that future time, then the result is a predicted anomaly score for the future time s. Taking the maximum (or the average) of all predicted anomalies scores in time from t to t+h, the result will be the PAV for the horizon range, given the impact of explaining metric i. To calculate the impact of metric i on all metrics, the average of the future values for a known value of metric i is used, as in Equation 8.

$$PAV(y_{i,t,h}) = \frac{1}{n}\sum_{j=1}^{n} \max_{t \le s \le t+h}\left(A(\hat{y}_{j,s,i}) \times v_{j,s}\right) \quad \text{Equation 8}$$

Note that when s=t then it represents a concurrent state. That is, the score will be at least as the AV.

Equation 8 can be extended to the entire known history of metrics, as in exemplary Equation 9.

$$PAV(\vec{y}_{t,h}) = \frac{1}{n}\sum_{j=1}^{n} \max_{t \le s \le t+h}\left(A(\hat{y}_{j,s}) \times v_{j,s}\right) \quad \text{Equation 9}$$

Figure 4:
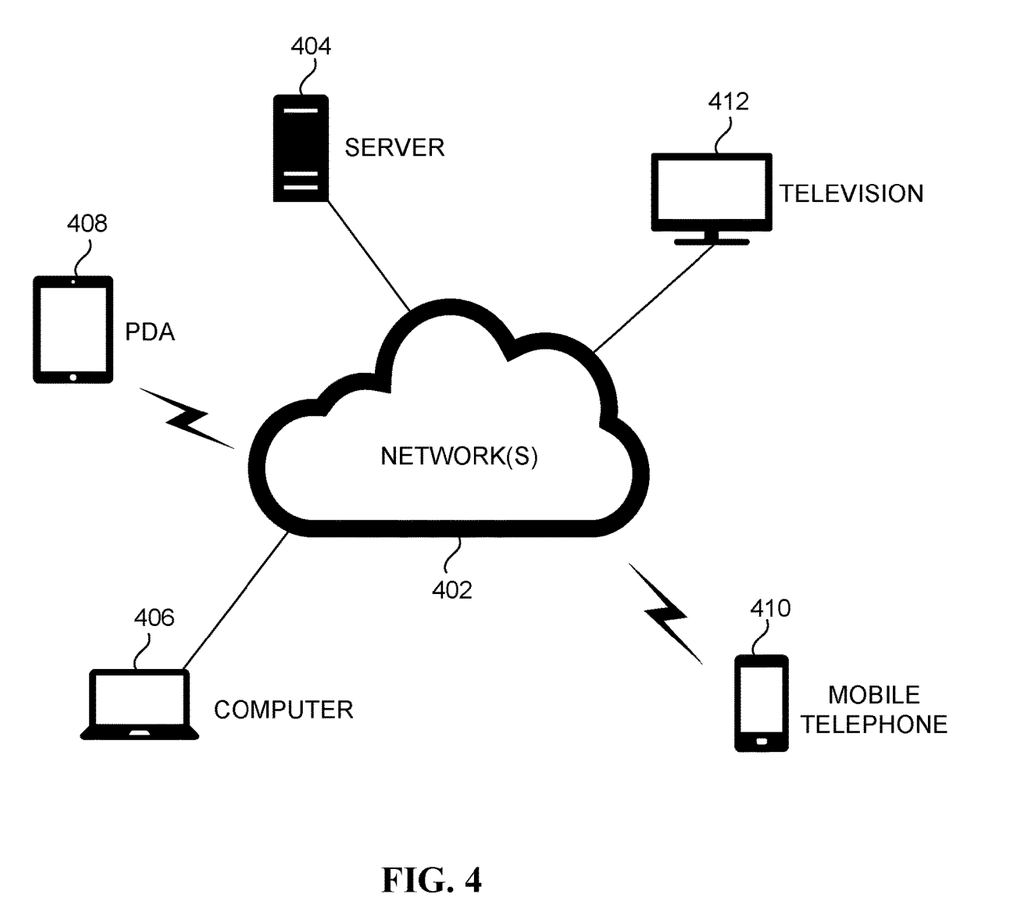
FIG. 4 illustrates a network architecture, in accordance with one possible embodiment.
Figure 5:
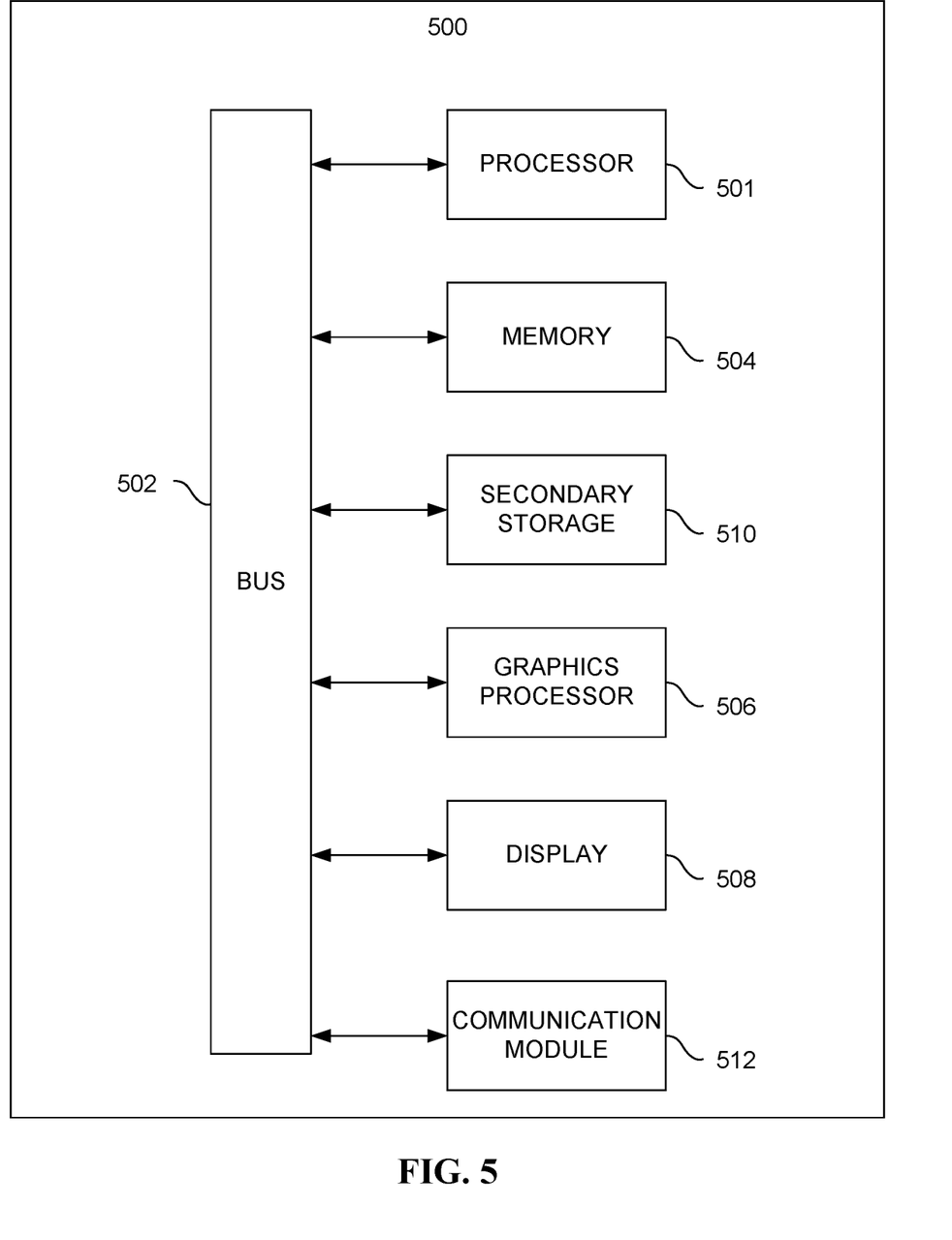
FIG. 5 illustrates an exemplary system, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    predict a state expected at a future time t, using a machine learning model, wherein the predicted state includes a series of scores predicted for a corresponding series of metrics at the future time t, wherein the metrics each correspond to a different parameter of an application or system component being monitored for the purpose of detecting anomalies in a functionality or configuration of the application or system component;
    determine a weighted score for the predicted state by:
        for each score in the series of scores, multiplying the score to a weight defined for a metric in the series of metrics that corresponds to the score to form a weighted score for the metric, wherein the weight defined for the metric varies based on time and is accordingly dependent on the future time t, and
        determining the weighted score for the predicted state as an average of the weighted scores formed for the metrics;
    cause at least one action to be performed, based on the weighted score for the predicted state, including:
        determining that the weighted score for the predicted state is outside of a defined range indicative of a desired anomaly and thus that the weighted score for the predicted state indicates an undesired anomaly, and
        causing the at least one action to be performed responsive to determining that the weighted score for the predicted state indicates the undesired anomaly.

2. The non-transitory computer-readable media of claim 1, wherein the weight at each time is a numerical value between −1 to +1, and wherein:
    a value of 0 indicates that the score is given no contribution when considering performance of the at least one action,
    a value of +1 indicates that the higher the score the greater the contribution of the score when considering the performance of the at least one action, and
    a value of −1 indicates that the lower the score the greater the contribution of the score when considering the performance of the at least one action.

3. The non-transitory computer-readable media of claim 1, wherein the machine learning model is trained using a history of scores calculated for the series of metrics.

4. The non-transitory computer-readable media of claim 1, wherein the at least one action includes generating an alert of the undesired anomaly.

5. A method, comprising:
at a computer system:
predicting a state expected at a future time t, using a machine learning model, wherein the predicted state includes a series of scores predicted for a corresponding series of metrics at the future time t, wherein the metrics each correspond to a different parameter of an application or system component being monitored for the purpose of detecting anomalies in a functionality or configuration of the application or system component;
determining a weighted score for the predicted state by:
for each score in the series of scores, multiplying the score to a weight defined for a metric in the series of metrics that corresponds to the score to form a weighted score for the metric, wherein the weight defined for the metric varies based on time and is accordingly dependent on the future time t, and
determining the weighted score for the predicted state as an average of the weighted scores formed for the metrics;
causing at least one action to be performed, based on the weighted score for the predicted state, including:
determining that the weighted score for the predicted state is outside of a defined range indicative of a desired anomaly and thus that the weighted score for the predicted state indicates an undesired anomaly, and
causing the at least one action to be performed responsive to determining that the weighted score for the predicted state indicates the undesired anomaly.

6. A system, comprising:
a non-transitory memory storing instructions; and
one or more processors in communication with the non-transitory memory that execute the instructions to:
predict a state expected at a future time t, using a machine learning model, wherein the predicted state includes a series of scores predicted for a corresponding series of metrics at the future time t, wherein the metrics each correspond to a different parameter of an application or system component being monitored for the purpose of detecting anomalies in a functionality or configuration of the application or system component;
determine a weighted score for the predicted state by:
for each score in the series of scores, multiplying the score to a weight defined for a metric in the series of metrics that corresponds to the score to form a weighted score for the metric, wherein the weight defined for the metric varies based on time and is accordingly dependent on the future time t, and
determining the weighted score for the predicted state as an average of the weighted scores formed for the metrics;
cause at least one action to be performed, based on the weighted score for the predicted state, including:
determining that the weighted score for the predicted state is outside of a defined range indicative of a desired anomaly and thus that the weighted score for the predicted state indicates an undesired anomaly, and
causing the at least one action to be performed responsive to determining that the weighted score for the predicted state indicates the undesired anomaly.

7. The non-transitory computer-readable media of claim 1, wherein the at least one action includes:
determining a cause of the undesired anomaly; and
triggering a change in at least one of an application or a system, based on the determined cause, to avoid a recurrence of the undesired anomaly.

8. The non-transitory computer-readable media of claim 1, wherein the weight is based on a defined importance of the metric.

* * * * *